United States Patent
Hossain et al.

(10) Patent No.: US 11,671,034 B2
(45) Date of Patent: ***Jun. 6, 2023

(54) MOTOR CONTROL SYSTEM AND METHOD FOR SELECTIVELY SHORTING MOTOR WINDINGS

(71) Applicant: HL MANDO CORPORATION, Gyeonggi-do (KR)

(72) Inventors: Shakil Hossain, Saginaw, MI (US); Lucas Ritter, Saginaw, MI (US); Awab Ali, Saginaw, MI (US); Tomy Sebastian, Saginaw, MI (US); Kade Hudson, Midland, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 23 days.

This patent is subject to a terminal disclaimer.

(21) Appl. No.: 17/394,311

(22) Filed: Aug. 4, 2021

(65) Prior Publication Data
US 2021/0367538 A1    Nov. 25, 2021

Related U.S. Application Data

(63) Continuation of application No. 16/664,760, filed on Oct. 25, 2019, now Pat. No. 11,128,241.
(Continued)

(51) Int. Cl.
*H02M 7/5387* (2007.01)
*H02P 3/22* (2006.01)
*B62D 5/04* (2006.01)

(52) U.S. Cl.
CPC .............. *H02P 3/22* (2013.01); *B62D 5/046* (2013.01); *B62D 5/0463* (2013.01)

(58) Field of Classification Search
CPC ...... B62D 5/005; B62D 5/046; B62D 5/0463; H02P 3/22
See application file for complete search history.

(56) References Cited

U.S. PATENT DOCUMENTS

| 6,577,086 B2 | 6/2003 | Sebastian |
|---|---|---|
| 2006/0087316 A1 | 4/2006 | Islam et al. |

(Continued)

FOREIGN PATENT DOCUMENTS

KR    10-1354100    1/2014

OTHER PUBLICATIONS

Notice of Allowance dated May 14, 2021 for U.S. Appl. No. 16/664,760 (now published as U.S. 2020/0321891).

*Primary Examiner* — Muhammad S Islam
(74) *Attorney, Agent, or Firm* — Ladas & Parry, LLP

(57) ABSTRACT

A motor control system shorts motor windings of a motor by using enhancement metal-oxide-semiconductor field-effect transistors (MOSFETs) so that the motor generates braking torque when all or some electric control units of the motor are disabled or failed. The motor control system comprises: a motor comprising a plurality of motor phase terminals; a plurality of electric control units electrically connected to the motor and configured to control the motor, wherein the electric control units configured to output control signals, respectively; a plurality of power sources, each of the power sources electrically connected to a respective one of the electric control units; and a shorting circuit connected between the power sources and the motor, the shorting circuit configured to selectively short the motor phase terminals in response to one or more of the control signals of the electric control units.

13 Claims, 3 Drawing Sheets

Related U.S. Application Data

(60) Provisional application No. 62/829,496, filed on Apr. 4, 2019.

(56) References Cited

U.S. PATENT DOCUMENTS

| | | |
|---|---|---|
| 2014/0265986 A1 | 9/2014 | Gebregergis et al. |
| 2018/0358910 A1* | 12/2018 | Mayr .................... B25J 9/0009 |
| 2019/0260314 A1* | 8/2019 | Mishima ............ G05B 19/4141 |
| 2020/0321891 A1 | 10/2020 | Hossain et al. |

* cited by examiner

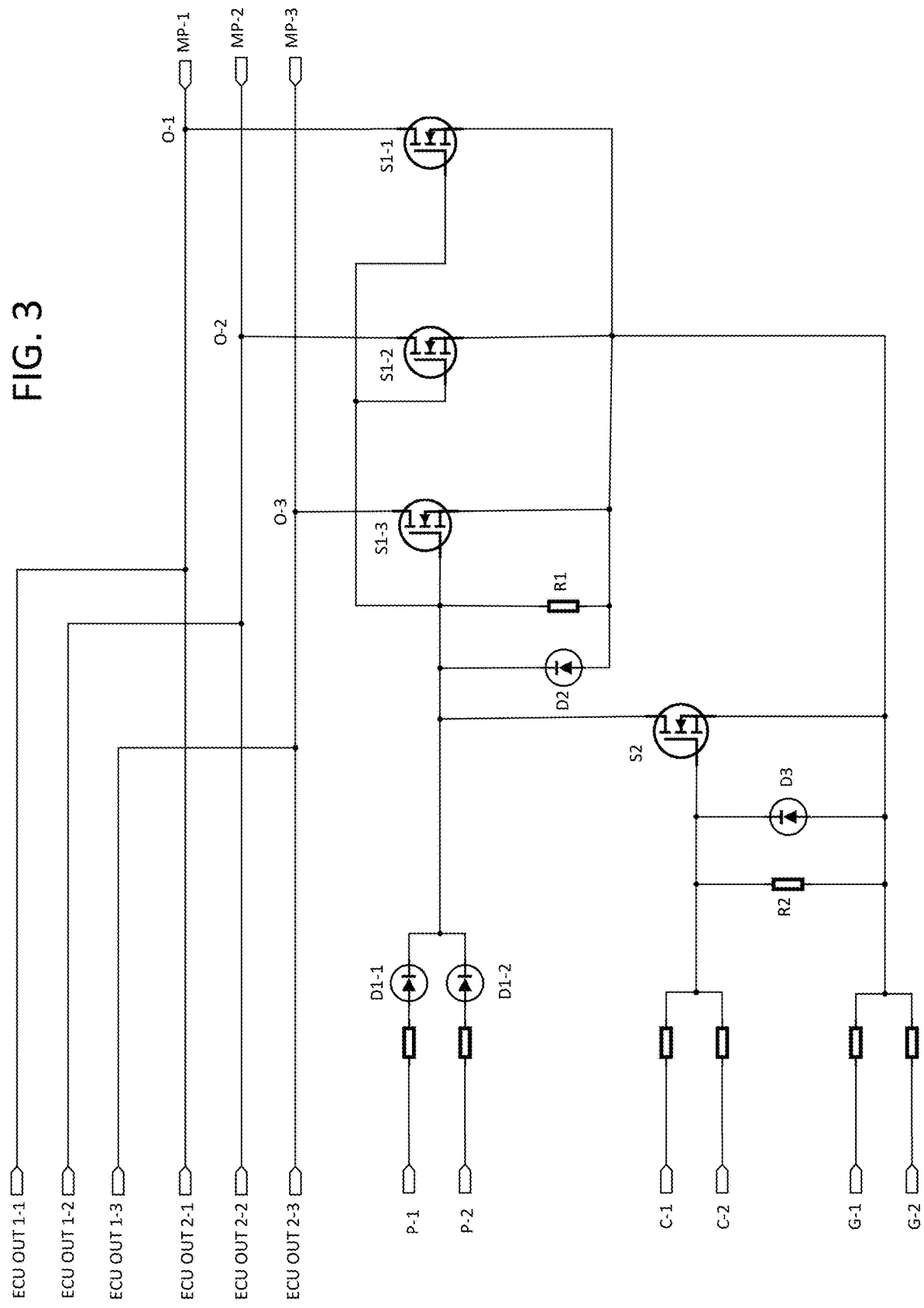

MOTOR CONTROL SYSTEM AND METHOD FOR SELECTIVELY SHORTING MOTOR WINDINGS

CROSS-REFERENCE TO RELATED APPLICATIONS

This application is a continuation of U.S. patent application Ser. No. 16/664,760 filed on Oct. 25, 2019, which claims the benefit of U.S. Patent Application Ser. No. 62/829,496, filed on Apr. 4, 2019, entitled "SSR Controlled BJT; Depletion FET Controlled BJT; Low Side MOSFET Turn ON with Resistor; Depletion Mode MOSFET; Enhancement Mode MOSFET", which is all hereby incorporated herein by reference in its entirety.

BACKGROUND

The present disclosure generally relates to an apparatus and method for controlling a motor. More specifically, some embodiments of the present disclosure relate to a motor control and method for selectively shorting motor winding such that braking torque can be produced by the motor.

Vehicles require a steering system to control the direction of travel. Previously, mechanical steering systems have been used. Mechanical steering systems typically include a mechanical linkage or a mechanical connection between a steering wheel and vehicle's road wheels. Thus, movement of the steering wheel causes a corresponding movement of the road wheels. Movement of such mechanical systems is often power assisted through the use of hydraulic assists or electric motors.

The mechanical steering systems are being replaced or supplemented by electrically driven steering systems, commonly known as "steer-by-wire" systems. Such steer-by-wire systems to varying extents replace, for example, the mechanical linkage between the steering wheel and the vehicle wheels with an electrically assisted actuator. The steer-by-wire system aims to eliminate physical or mechanical connection between a steering wheel and vehicle wheels by using electrically controlled motors change the direction of the vehicle wheels and to provide feedback to a driver.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

Various embodiments of the present disclosure may provide a motor control system configured to short motor windings of a motor so that the motor generates braking torque when all or some electric control units of the motor are disabled or failed.

According to some embodiments of the present disclosure, a motor control system may comprise: a motor comprising a plurality of motor phase terminals; a plurality of electric control units electrically connected to the motor and configured to control the motor, wherein the electric control units configured to output control signals, respectively; a plurality of power sources, each of the power sources electrically connected to a respective one of the electric control units; and a shorting circuit connected between the power sources and the motor, the shorting circuit configured to selectively short the motor phase terminals in response to one or more of the control signals of the electric control units.

The shorting circuit may be configured to, when receiving none of the control signals from the electric control units, short the motor phase terminals for braking of the motor. The shorting circuit may be configured, when receiving at least one of the control signals from at least one of the electric control units, not to short the motor phase terminals.

The shorting circuit may comprise: a plurality of first switches, wherein each of the first switches is connected between a respective one of the power sources and a respective one of the motor phase terminals; and at least one second switch connected between the electric control units and the first switches, the at least one second switch is configured to cause the first switches to be turned on or off in response to at least one of the control signals from at least one of the electric control units. The at least one second switch may be configured to cause the first switches to be turned on to short the motor phase terminals when receiving none of the control signals from the electric control units. The at least one second switch may be configured to cause the first switches to be turned off not to short the motor phase terminals when receiving at least one of the control signals from at least one of the electric control units.

The first and second switches may be enhancement metal-oxide-semiconductor field-effect transistors (MOSFETs). For example, the first and second switches are N-type enhancement MOSFETs.

The shorting circuit may comprise: a plurality of first MOSFETs, each of the first MOSFETs having first, second and third terminals, and at least one second MOSFET having first, second and third terminals. The first terminal of the at least one second MOSFET may be connected to the electric control units to receive the control signals, the power sources may be connected to the first terminals of the first MOSFETs and the second terminal of the at least one second MOSFET, and the second terminal of each of the first MOSFETs may be connected to one respective of the motor phase terminals. The first terminals of the first and second MOSFETs may be gate, the second terminals of the first and second MOSFETs may be drain, and the third terminals of the first and second MOSFETs may be source. The third terminals of the first and second MOSFETs are grounded. The third terminals of the first and second MOSFETs may be connected to each other.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which:

FIG. 3 is a conceptual circuit diagram of a circuit for selectively shorting motor phase terminals according to an embodiment of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
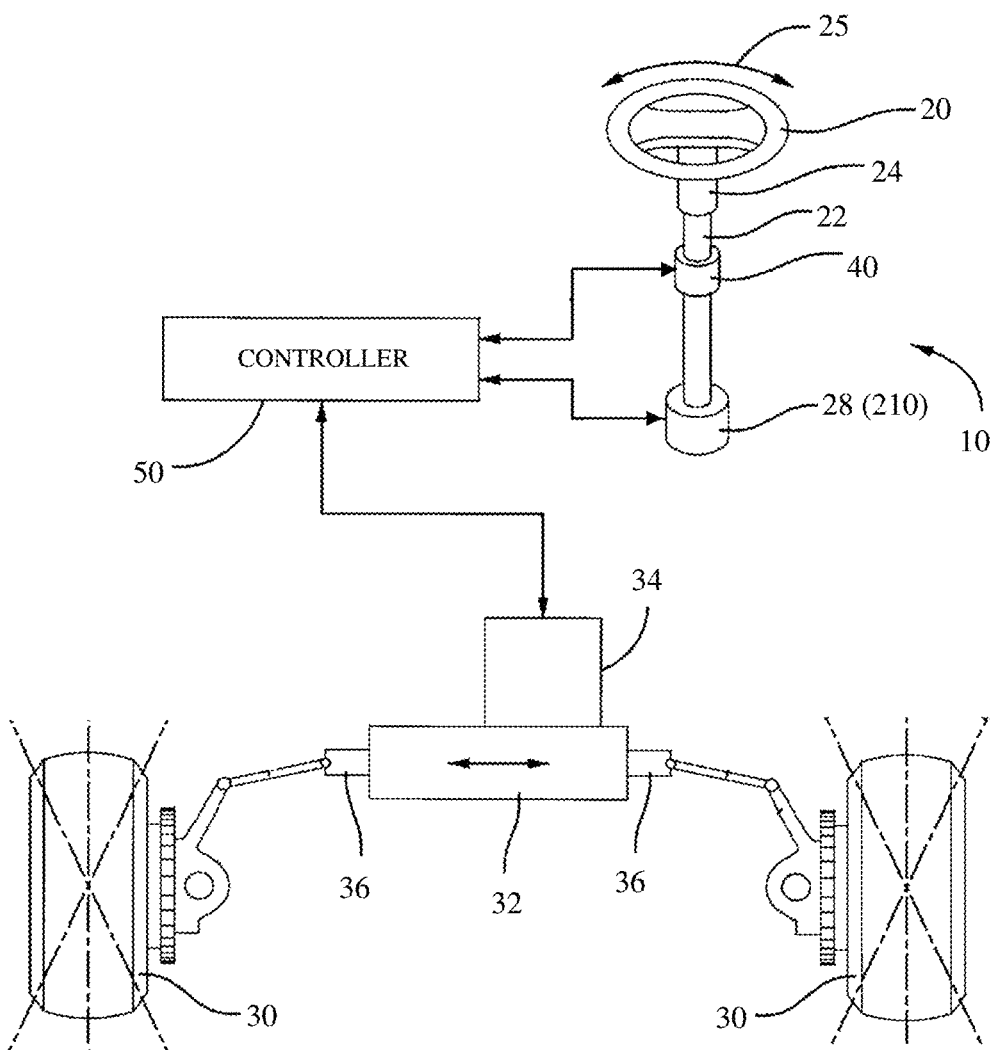
FIG. 1 is a schematic view of a vehicle including a steer-by-wire system according to an embodiment of the present disclosure.

Referring now to FIG. 1, a steer-by-wire system 10 for use in a vehicle 1 is illustrated. The steer-by-wire system 10 allows a driver or operator of the vehicle 1 to control the direction of the vehicle 1 or road wheels 30 of the vehicle 1 through the manipulation of a steering wheel 20. The steering wheel 20 is operatively coupled to a steering shaft (or steering column) 22. The steering wheel 20 may be directly or indirectly connected with the steering shaft 22. For example, the steering wheel 20 may be connected to the steering shaft 22 through a gear, a shaft, a belt and/or any connection means. The steering shaft 22 may be installed in a housing 24 such that the steering shaft 22 is rotatable within the housing 24.

The vehicle wheels 30 may be connected to knuckles, which are in turn connected to tie rods. The tie rods are connected to a steering assembly 32. The steering assembly 32 may include a steering actuator motor 34 (e.g. an electric motor) and steering rods 36. The steering rods 36 may be operatively coupled to the steering actuator motor 34 such that the steering actuator motor 34 is adapted to move the steering rods 36. The movement of the steering rods 36 controls the direction of the road wheels 30 through the knuckles and tie rods.

One or more sensors 40 may configured to detect position, angular displacement or travel 25 of the steering shaft 22 or steering wheel 20, as well as detecting the torque of the angular displacement. The sensors 40 provide electric signals to a controller 50 indicative of the angular displacement and torque 25. The controller 50 sends and/or receives signals to/from the steering actuator motor 34 to actuate the steering actuator motor 34 in response to the angular displacement 25 of the steering wheel 20.

In use, the steering wheel 20 is angularly displaced 25 such that the steering shaft 22 can be also angularly displaced. The sensors 40 detect the angular displacement 25 of the steering shaft 22, and the sensors 40 send signals to the controller 50 indicative of the relative amount of angular displacement of the steering shaft 22. The controller 50 sends signals to the steering actuator motor 34 indicative of the relative amount of the angular displacement 30. In response, the steering actuator motor 34 moves the steering rod 36 laterally so that the road wheels 12 are turned. Thus, the controller 50 controls the distance that the steering rod 36 is moved based on the amount of the angular displacement 25 of the steering shaft 22. Movement of the steering rod 36 manipulates the tie rods and knuckles to reposition the road wheels 30 of vehicle 1. Accordingly, when the steering wheel 20 is turned, the road wheels 30 are turned.

In the steer-by-wire steering system, the steering wheel 20 may be mechanically isolated from the road wheels 30. For example, the steer-by-wire system has no mechanical link connecting the steering wheel 25 from the road wheels 30. Accordingly, the steer-by wire steering system needs to provide the driver or operator with the same "road feel" that the driver receives with a direct mechanical link. Furthermore, it is desirable to have a device that provides a mechanical back up "road feel" in the event of multiple electronic failures in the steer-by-wire system. In addition, a device that provides positive on-center feel and accurate torque variation as the handwheel is rotated is also desirable.

Therefore, the vehicle 10 may comprise a feedback actuator (FBA) or steering feel actuator (SFA) 28. The feedback actuator or steering feel actuator 28 may comprise an electric motor (e.g. a motor 210 of FIG. 2) which is connected to the steering shaft or steering column 22. For example, a gear or belt assembly may connect an output of the feedback actuator 28 to the steering shaft 22. Alternatively, the feedback actuator 28 may be directly coupled to the steering shaft 22. The feedback actuator 28 is actuatable to provide resistance to rotation of the steering wheel 20. The controller 50 is operatively coupled to the sensors 40 and to the feedback actuator 28. The controller 50 receives signals indicative of the applied torque and angular rotation of the steering wheel 20 from the sensors 40. In response to the signals from the sensors 40, the controller 50 generates and transmits a signal corresponding to the sensed torque and angular rotation of the steering wheel 20 sensed by the sensors 40 and the feedback actuator 28 generates resistance torque to the rotation of the steering wheel 20 in response to the signal of the controller 50 to provide the road feel to the driver. However, when the feedback of the feedback actuator 28 is removed due to system failures such as inverter and it's control failures, the driver will have the uncomfortable feeling of being separated from the road wheels, not quite in control, and will tend to oversteer the vehicle, particularly in demanding situations such as sharp or sudden turns.

Therefore, according to some embodiments of the present disclosure, a motor control system is configured to short motor windings of a motor included in the feedback actuator or steering feel actuator with battery power available in a vehicle so that the motor provides the braking torque to the steering wheel when all or some electric control units of the feedback actuator or steering feel actuator are disabled or failed. This may prevent the driver oversteer.

Figure 2:
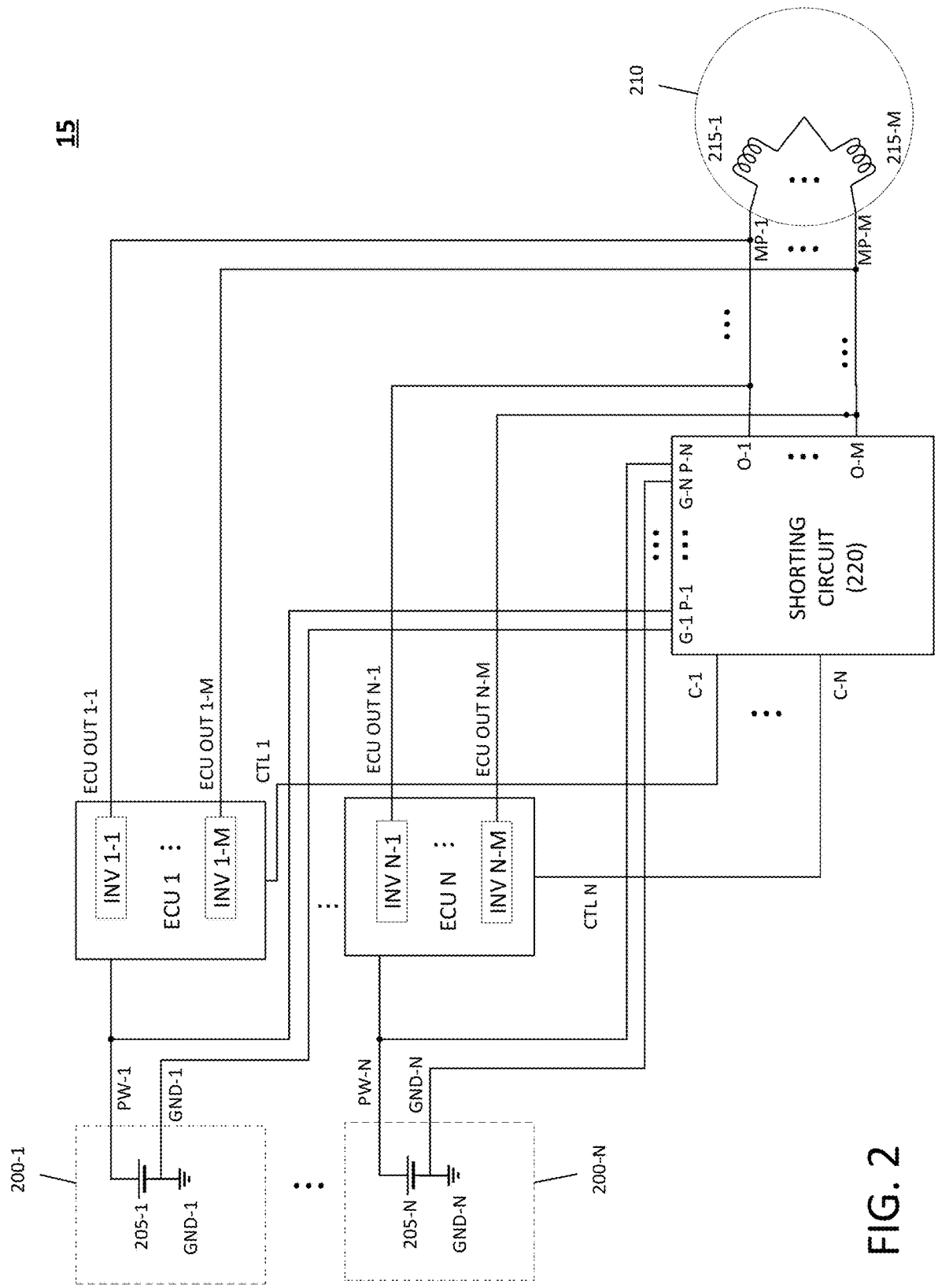
FIG. 2 is a schematic diagram of a motor control system according to an embodiment of the present disclosure.

FIG. 2 is a schematic diagram of a motor control system according to an embodiment of the present disclosure.

Power sources 200-1 to 200-N (N is a positive integer more than 1) are configured to supply power to a respective one of electric control units (ECUs) 1 to N. The power sources 200-1 to 200-N supply voltages to a respective one of ECUs 1 to N and a shorting circuit 220. For example, the power sources 200-1 to 200-N may be batteries 205-1 to 205-N. The power sources 200-1 to 200-N may be electrically connected to ECUs 1 to N through power lines PW-1 to PW-N and ground lines GND-1 to GND-N, respectively. The power sources 200-1 to 200-N may also be electrically connected to the shorting circuit 220 through the power lines PW-1 to PW-N and the ground lines GND-1 to GND-N.

Therefore, the power sources 200-1 to 200-N can supply power to the shorting circuit 220 even when the invertors INV 1-1 to INV N-M of the ECUs 1 to N are disabled or failed.

The motor 210 may be, for example, but not limited to, a multi-phase motor comprising a plurality of motor windings 215-1 to 215-M (M is a positive integer more than 1). The motor 210 may have a plurality of motor phase terminals MP-1 to MP-M connected to a respective one of the motor windings 215-1 to 215-M. For example, the motor 210 may be a multi-phase AC permanent magnet motor. In the present embodiment, the motor 210 may be a three-phase permanent magnet motor having a U-phase winding 215-1, a V-phase winding 215-2, and a W-phase winding 215-3.

The ECUs 1 to N comprise multi-phases (M-phases) inverters INV 1-1 to N-M. inverters INV 1-1 to N-M are coupled to the motor phase terminals MP-1 to MP-M connected to a respective one of the motor windings 215-1 to 215-M. The inverters INV 1-1 to N-M receive power from the power sources 200-1 to 200-N, and convert direct current (DC) voltages provided from the power sources 200-1 to 200-N to alternating currents (AC). The outputs generated by the inverters INV 1-1 to N-M are applied to the motor windings 215-1 to 215-M through the motor phase terminals MP-1 to MP-M to drive the multi-phase (M-phase) motor 210. The ECUs 1 to N also generate control signals CTL 1 to N. The control signals CTL 1 to N may have substantially the same voltage as battery voltages of the batteries 205-1 to 205-N of the power sources 200-1 to 200-N.

The ECUs 1 to N may have, for example, but not limited to, one or more of a circuit, microprocessor or computer, which monitors and physically alters the operating conditions of the motor control system 15. The controller ECUs 1 to N may also be configured to accept input and output from a wide array of input and output devices for receiving or sending values.

The shorting circuit 220 is connected between the power sources 200-1 to 200-N and the motor 210. The shorting circuit 200 is configured to selectively short the motor phase terminals MP-1 to MP-M in response to one or more of the control signals CTL-1 to CTL-N received from the ECUs 1 to N. For example, when the shorting circuit 220 receives no control signal from all of the ECUs 1 to N, such as in the case that all ECUs 1 to N are disabled or failed (for example, all invertors of ECUs 1 to N are disabled or failed), the shorting circuit 220 is configured to short the motor phase terminals MP-1 to MP-M so that the motor 210 can generate the braking torque. However, when the short circuit 220 receives at least one of the control signals CTL-1 to CTL-N from at least one of the ECUs 1 to N, such as in the case that any one of the ECUs 1 to N is enabled, the shorting circuit 220 configured to remove the short of the motor phase terminals MP-1 to MP-M or does not short the motor phase terminals MP-1 to MP-M.

FIG. 3 is a conceptual circuit diagram of the shorting circuit 220 according to an embodiment of the present disclosure.

The shorting circuit 220 may comprise a plurality of first switches S1-1 to S1-M. The first switches S1-1 to S1-M are connected to the motor phase terminals MP-1, MP-2, MP-3, respectively. The first switches S1-1 to S1-M may short the motor phase terminals MP-1 to MP-M when the first switches S1-1 to S1-M are turned on. However, when the first switches S1-1 to S1-M are turned off, the switches S1-1 to S1-M may not short the motor phase terminals MP-1 to MP-M or may remove the short of the motor phase terminals MP-1 to MP-M. The number of the first switches S1-1 to S1-M may correspond to the number of the phases of the motor 210. For instance, in the embodiment of FIG. 3, because the motor 210 is a three-phase motor, the shorting circuit 220 has three (3) first switches S1-1, S1-2, S1-3. However, the shorting circuit 220 may have the different number of the first switches S1-1 to S1-M from the number of the phases of the motor 210

For illustration purposes, in this exemplary embodiment shown in FIG. 3, the motor 210 is a three-phase motor having phases U, V, W and two (2) ECUs, ECU 1 and ECU 2, and two (2) power sources 200-1 and 200-2 are connected to the shorting circuit 220. However, the present disclosure is not limited thereto.

The first switches S1-1, S1-2, S1-3 may be enhancement metal-oxide-semiconductor field-effect transistors (MOSFETs). In the embodiment of FIG. 3, the first switches S1-1, S1-2, S1-3 are illustrated as N-type MOSFETs for illustration purposes only. However, one skilled in the art will recognize that other transistor types including P-type MOSFETs could be used instead of the N-type MOSFETs shown in this illustrative example, the substitution could be made to replace the N-type MOSFETs with P-type MOSFETs. Further, any switch, such as a transistor, which is turned off when a voltage between a first terminal of the switch and a second terminal of the switch is below a threshold and is turned off when the voltage between the first terminal of the switch and the second terminal of the switch is above the threshold, can be used instead of the MOSFETs.

The shorting circuit 220 receives input voltages from the power sources 200-1 and 200-2 of FIG. 2 through terminals PT-1 and PT-2, respectively. The input voltages received from the power sources 200-1 and 200-2 are provided to first terminals (e.g. gates) of the first MOSFETs S1-1, S1-2, S1-3. Optionally, Diodes D1-1 and D1-2 may be coupled in series to the terminals PT-1 and PT-2, respectively, to prevent backward path to the power sources 200-1 and 200-2. A diode D2 may be coupled in parallel to the first terminals (e.g. gates) of the first MOSFETs S1-1, S1-2, S1-3 to protect gate voltages, and a pull down resistor R1 may be coupled between the first terminals (e.g. gates) and second terminals (e.g. sources) of the first MOSFETs S1-1, S1-2, S1-3.

A third terminal (e.g. drain) of the first MOSFET S1-1 is connected to a U-phase motor terminal MP-1 connected to the motor winding 215-1, a third terminal (e.g. drain) of the first MOSFET S1-2 is connected to a V-phase motor terminal MP-2 connected to the motor winding 215-2, and a third terminal (e.g. drain) of first MOSFET S1-3 is connected to a W-phase motor terminal MP-3 connected to the motor winding 215-3.

The shorting circuit 220 further includes one or more second switches S2. The second switch S2 can be, for example, but not limited to, an enhancement MOSFET. In the embodiment of FIG. 3, the second switch S2 is illustrated as N-type MOSFET for illustration purposes only. However, one skilled in the art will recognize that other transistor types including P-type MOSFET could be used instead of the N-type MOSFET shown in this illustrative example, the substitution could be made to replace the N-type MOSFET with P-type MOSFET. Further, any switch, such as transistor, which is turned off when a voltage between a first terminal of the switch and a second terminal of the switch is below a threshold and is turned off when the voltage between the first terminal of the switch and the second terminal of the switch is above the threshold, can be used instead of the MOSFET.

The second MOSFET S2 causes the first MOSFETs S1-1, S1-2, S1-3 to be turned on or off in response to one or more of control signals CTL 1 and CTL 2 received from ECUs 1 and 2. For example, if the second MOSFET S2 receives no control signal from all of ECUs 1 and 2, the first MOSFETs S1-1, S1-2, S1-3 are turned on so that the motor phase terminals MP-1 to MP-M are shorted. However, if the second MOSFET S2 receives a control signal from any one of ECUs 1 and 2, the first MOSFETs S1-1, S1-2, S1-3 are turned off and the motor phase terminals MP-1 to MP-M are not shorted by the first MOSFETs S1-1, S1-2, S1-3.

For instance, a first terminal (e.g. gate) of the second MOSFET S2 is connected to the ECUs 1 and 2 through terminals C-1 and C-2 to receive control signals CTL 1 and CTL 2 from the ECUs 1 and 2. Optionally, a diode D3 may be coupled in parallel to the first terminal (e.g. gate) of the second MOSFET S2 to protect a gate voltage, and a pull down resistor R2 may be coupled between the first terminal (e.g. gate) and the second terminal (e.g. source) of the second MOSFET S2. The second terminal (e.g. source) of the second MOSFET S2 may be grounded. For example, the source of the second MOSFET S2 is connected to the grounds of the power sources 200-1 and 200-2 through ground terminals GT-1 and GT-2.

In operation, when all of the ECUs 1 and 2 are disabled or failed (for instance all of invertors of the ECUs 1 and 2 are disabled or failed), voltages of control signals CTL 1 and CTL 2 inputted from the ECUs 1 and 2 through the terminals CT-1 and CT-2 are at 0V. Then, because the gate-source voltage of the second MOSFET S2 is 0V, the second MOSFET S2 is turned off. This makes the gate-source voltages of the first MOSFETs S1-1, S1-2, S1-3 at approximately battery voltages of the batteries 205-1 and 205-2 of the power sources 200-1 and 200-2 since the terminals PT1 and PT2 provide the battery voltages of batteries 205-1 and 205-2 of the power sources 200-1 and 200-2 to the gates of the first MOSFETs S1-1, S1-2, S1-3. In turn, the first MOSFETs S1-1, S1-2, S1-3 are turned on and short the motor phase terminals MP-1, MP-2, MP-3. This results in the braking of the motor 210. The motor 210 may act as a brake and/or damper to oppose any motion applied to the motor 210.

However, if any one of the ECUs 1 and 2 is enabled, voltages of control signals CTL1 and CTL2 inputted from the ECUs 1 and 2 through CT-1 and CT-2 are at approximately the battery voltage. Then, because the gate-source voltage of the second MOSFET S2 is at approximately the battery voltage, the second MOSFET S2 is turned on. This makes the gate-source voltages of the first MOSFETs S1-1, S1-2, S1-3 below threshold voltages of the first MOSFETs S1-1, S1-2, S1-3. In turn, the first MOSFETs M1-1, M1-2, M1-3 are turned off and does not short the motor phase terminals MP-1, MP-2, MP-3 or remove the motor 210 from the short status.

Therefore, when all invertors INV 1-1 to INV N-M of the ECUs 1 to N are disabled or failed, the shorting circuit 220 is configured to short the motor phase terminals MP-1 to MP-M connected to the motor windings 215-1 to 215-M so that the motor 210 can generate the braking torque. In the case that the motor 210 is included in the feedback actuator or steering feel actuator 28, the feedback actuator or steering feel actuator 28 may generate the braking torque to the steering wheel 20 and prevent from providing uncomfortable feeling of being separated from the road wheels to the driver or oversteering the vehicle by the driver when all or some electric control units of the feedback actuator or steering feel actuator 28 are disabled or failed.

In some embodiments of the present disclosure, the motor for the feedback actuator or steering feel actuator is described, but the present disclosure is not limited thereto. However, one skilled in the art will recognize that the motor control system according to the present disclosure could be applied to or used with any motor that requires braking and/or damping torque.

Although the example embodiments have been described in detail, it should be understood that various changes, substitutions and alterations can be made herein without departing from the spirit and scope of the application as defined by the appended claims.

In the present disclosure, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements. The term "connected" or "coupled" may mean direct or indirect connection unless otherwise specified.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A steering apparatus, comprising:
    a steering shaft operatively coupled to a steering wheel of a vehicle;
    a motor operatively coupled to the steering shaft, and comprising a plurality of motor phase terminals;
    a shorting circuit disposed between the motor and a power source of the vehicle; and
    a processor electrically coupled to the motor and the shorting circuit, and configured to control the motor,
    wherein the processor is configured to control the shorting circuit to selectively short at least two terminals of the motor phase terminals.

2. The steering apparatus of claim 1, wherein the processor is configured to control the shorting circuit to short the motor phase terminals for braking of the motor when receiving none of a control signal from the processor.

3. The steering apparatus of claim 1, wherein the processor is configured to control the shorting circuit not to short the motor phase terminals when receiving a control signal from at least one of the processor.

4. The steering apparatus of claim 1, wherein the shorting circuit comprises:
    a plurality of first switches, wherein each of the first switches is connected between the power source and a respective one of the motor phase terminals; and
    at least one second switch connected between the processor and the first switches, the at least one second switch is configured to cause the first switches to be turned on or off in response to a control signal from the processor.

5. The steering apparatus of claim 1, wherein:
the shorting circuit comprises: a plurality of first MOSFETs, each of the first MOSFETs having first, second and third terminals, and at least one second MOSFET having first, second and third terminals; and
the first terminal of the at least one second MOSFET is connected to the processor to receive the control signal, the power source is connected to the first terminals of the first MOSFETs and the second terminal of the at least one second MOSFET, and the second terminal of each of the first MOSFETs is connected to one respective of the motor phase terminals.

6. The steering apparatus of claim 4, wherein the at least one second switch is configured to cause the first switches to be turned on to short the motor phase terminals when receiving none of the control signal from the processor.

7. The steering apparatus of claim 4, wherein the at least one second switch is configured to cause the first switches to be turned off not to short the motor phase terminals when receiving the control signal from the processor.

8. The steering apparatus of claim 4, wherein the first and second switches are enhancement metal-oxide-semiconductor field-effect transistors (MOSFETs).

9. The steering apparatus of claim 4, wherein the first and second switches are N-type enhancement MOSFETs.

10. The steering apparatus of claim 5, wherein the first and second MOSFETs are enhancement MOSFETs.

11. The steering apparatus of claim 5, wherein first and second MOSFETs are N-channel enhancement MOSFETs.

12. The steering apparatus of claim 5, wherein the first terminals of the first and second MOSFETs are gate, the second terminals of the first and second MOSFETs are drain, and the third terminals of the first and second MOSFETs are source.

13. The steering apparatus of claim 5, wherein the third terminals of the first and second MOSFETs are connected to each other.

* * * * *